United States Patent
Looi et al.

(10) Patent No.: US 7,383,398 B2
(45) Date of Patent: Jun. 3, 2008

(54) PRESELECTING E/M LINE REPLACEMENT TECHNIQUE FOR A SNOOP FILTER

(75) Inventors: Lily P Looi, Portland, OR (US); Liqun Cheng, Salt Lake City, UT (US); Kai Cheng, Portland, OR (US); Faye A Briggs, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 11/394,503

(22) Filed: Mar. 31, 2006

(65) Prior Publication Data

US 2007/0239941 A1   Oct. 11, 2007

(51) Int. Cl.
*G06F 12/12* (2006.01)
(52) U.S. Cl. ...................... 711/146; 711/133
(58) Field of Classification Search ............. None
See application file for complete search history.

(56) References Cited

U.S. PATENT DOCUMENTS

| | | | |
|---|---|---|---|
| 6,598,123 B1* | 7/2003 | Anderson et al. | 711/133 |
| 6,704,845 B2* | 3/2004 | Anderson et al. | 711/146 |
| 6,857,048 B2* | 2/2005 | Rankin et al. | 711/133 |
| 6,959,364 B2* | 10/2005 | Safranek et al. | 711/146 |
| 7,093,079 B2* | 8/2006 | Quach et al. | 711/141 |
| 2003/0135696 A1* | 7/2003 | Rankin et al. | 711/136 |
| 2003/0177317 A1* | 9/2003 | Anderson et al. | 711/146 |
| 2004/0117561 A1* | 6/2004 | Quach et al. | 711/146 |
| 2006/0095684 A1* | 5/2006 | Shen | 711/146 |
| 2007/0061520 A1* | 3/2007 | Jones et al. | 711/146 |
| 2007/0233965 A1* | 10/2007 | Cheng et al. | 711/146 |
| 2007/0233966 A1* | 10/2007 | Chinthanmani et al. | 711/146 |

\* cited by examiner

*Primary Examiner*—Kevin Verbrugge
(74) *Attorney, Agent, or Firm*—Blakely, Sokoloff, Taylor & Zafman LLP

(57) ABSTRACT

A snoop filter maintains data coherency information for multiple caches in a multi-processor system. When a new request for a memory line arrives, an entry of the snoop filter is selected for replacement if there is no available slot in the snoop filter to accommodate the new request. The selected entry is among the entries predicted to be short-lived based on a coherency state. An invalidation message is sent to the one of the caches with which the selected entry is associated.

20 Claims, 3 Drawing Sheets

PRESELECTING E/M LINE REPLACEMENT TECHNIQUE FOR A SNOOP FILTER

BACKGROUND

1. Field

Cache coherency in a multi-processor system.

2. Description of Related Art

In a multi-processor system having multiple caches, each cache may have a copy of a piece of data stored in memory. Problems arise when multiple data copies in the caches are not coherent. Various techniques have been developed to ensure data coherency. For example, when the data in one cache is modified, other copies of the data are marked as invalid so that they will not be used.

A copy of data in the cache is often referred to as a cache line, a memory line, or a line. A snooping operation refers to the process in which an agent of a bus monitors the bus for memory transactions, e.g., a read/write operation to a main memory location which may also reside in a cache. The agent may record the states of the cache lines involved in the memory transactions in a directory. The state of the cache line may indicate whether the line has only one valid copy outside of the main memory, has multiple valid copies shared by multiple caches, or has been invalidated. A data entry in the directory is often indexed by its memory address (e.g., the address in the main memory). As the size of the directory is generally less than the size of the memory, the directory sometimes may run out of space to record the state of a line for new memory transactions.

BRIEF DESCRIPTION OF THE DRAWINGS

Embodiments are illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
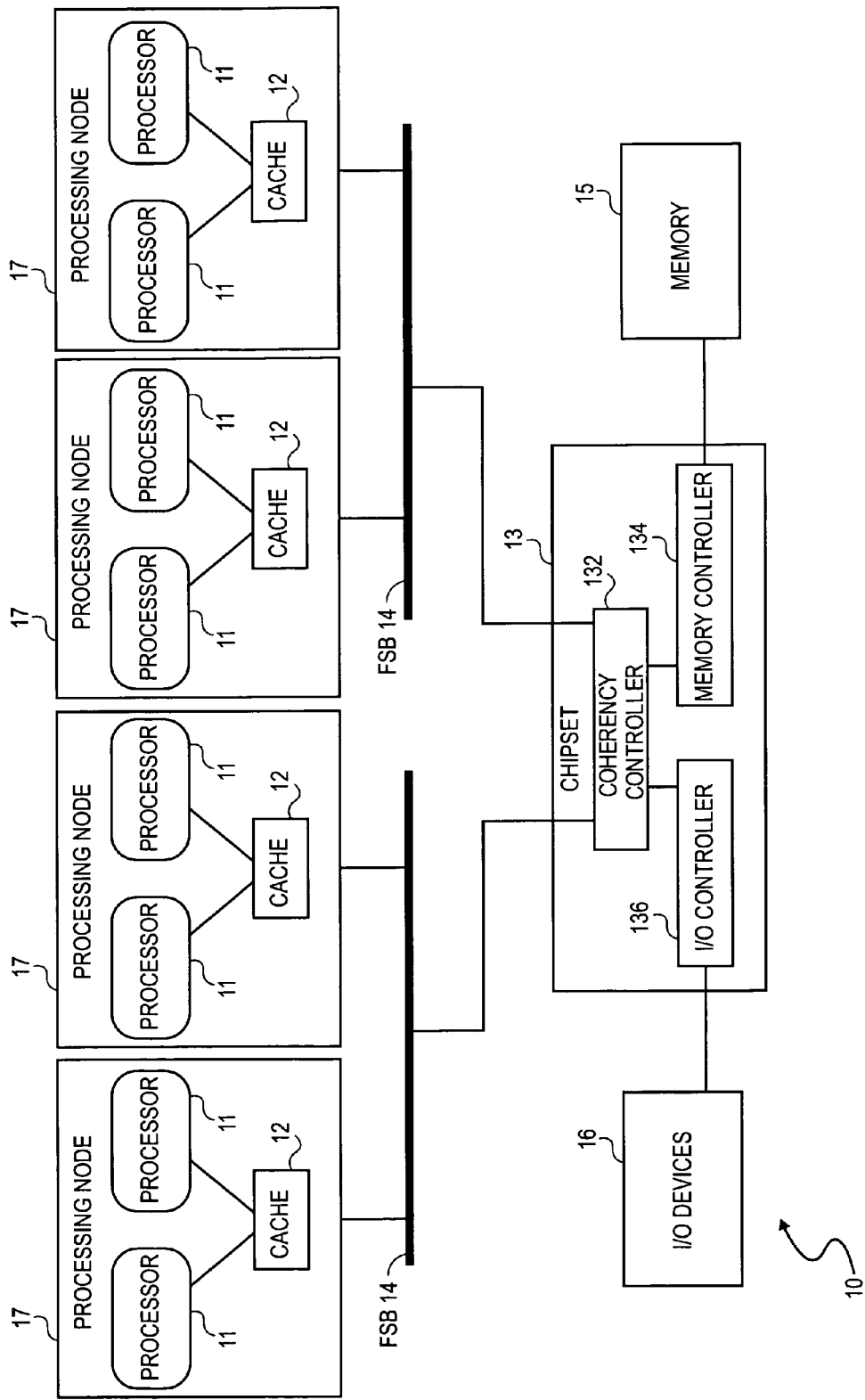
FIG. 1 is a block diagram of an embodiment of a multi-processor system including a plurality of caches.

Referring to FIG. 1, an embodiment of a multi-processor system 10 may comprise a plurality of processing nodes 17 interconnected with a chipset 13. Each of the processing nodes 17 may include one or more processors 11 (two processors per processing node are shown) and a cache 12. Each cache 12 may be locally accessibly by processors 11 of a "home node" (the processing node in which this cache is located), and remotely accessible by processors 11 of "remote nodes" (the processing nodes other than the home node). Cache 12 is referred to as a "local cache" with respect to processors 11 of the home node. Processing nodes 17 may be coupled to chipset 13 via two or more front side buses (FSBs) 14 (only two FSBs are shown) or other types of datapaths (e.g., point-to-point connections). One or more of processing nodes 17 may be implemented on a single chip. System 10 may be used as a server system because of the high collective processing power it possesses. However, system 10 may also be used as desktop computers or any other computing systems.

Chipset 13 may include a coherency controller 132 for processing requests received from FSBs 14 and maintaining data coherency among caches 12. The functions of coherency controller 132 will be discussed in detail below with reference to FIG. 2. Chipset 13 may include a memory controller 134 for providing processing nodes 17 and other components of system 10 with access to storage locations of a memory 15. Memory 15 may comprise one or more types of memory devices such as, for example, dynamic random access memory (DRAM) devices, synchronous dynamic random access memory (SDRAM) devices, double data rate (DDR) SDRAM devices, or other volatile or non-volatile memory devices suitable for server or general applications.

Chipset 13 may also include an I/O controller 136 to provide an interface for processing nodes 11 and other components of system 10 to access to one or more I/O devices 16. I/O devices 16 may include Industry Standard Architecture (ISA) devices, Peripheral Component Interconnect (PCI) devices, PCI Express devices, Universal Serial Bus (USB) devices, Small Computer System Interface (SCSI) devices, or other standard or proprietary I/O devices suitable for server or general applications.

Processors 11 may store lines of memory in their respective local caches 12 to facilitate quick access. Caches 12 may store data, instructions, or a combination of both. For each cache line, caches 12 may store a tag (e.g., a portion of a memory address) to associate or map the cache line to a corresponding line in memory 15. Caches 12 may also store and update a coherency state for each cache line. For example, caches 12 may support a MESI coherency protocol in which a cache line may have a modified (M) state, an exclusive (E) state, a shared (S) state, or an invalid (I) state.

According to an example of the MESI coherency protocol, the invalid state (I) indicates that the associated cache line is not a current copy of the line. The current copy of the line may reside in memory 15 and/or one of the other caches 12 in the remote nodes. The shared state (S) indicates that the associated cache line is a current copy of the line, and that zero or more other caches 12 may also have a current copy of the line in the shared state. The exclusive state (E) indicates that the cache 12 in which the associated cache line resides has obtained ownership of the line and has a current copy of the line. Further, the exclusive state indicates that no other cache 12 has a copy of the line in the modified, exclusive, or shared state. The modified state (M) indicates that the cache 12 in which the associated cache line resides has a current copy of the line which may have been modified. Like the exclusive state, the modified state indicates that no other cache 12 has a copy of the line in the modified, exclusive, or shared state. Further, the modified state indicates that the associated line may be more current than the corresponding data line in memory 15.

Figure 2:
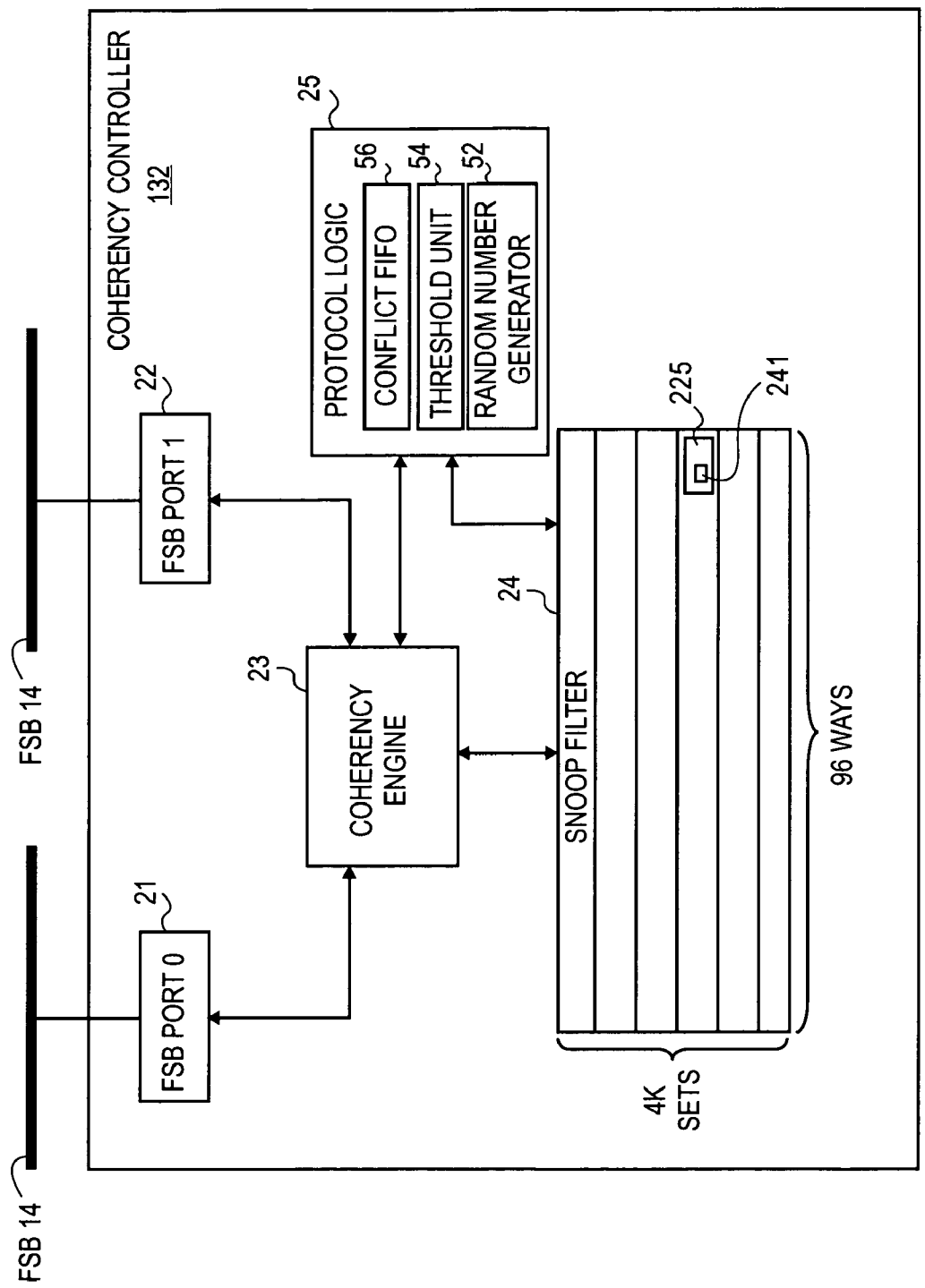
FIG. 2 is a block diagram of an embodiment of a coherency controller of the multi-processor system of FIG. 1, in which the coherency controller includes a snoop filter.

The states of cache lines may be tracked by a centralized directory, e.g., a snoop filter or any other memory component in a centralized location of system 10. Referring to FIG. 2, in one embodiment, coherency controller 132 may include a snoop filter 24 to provide coherency information of the cache lines. As shown in FIG. 2, an embodiment of coherency controller 132 may comprise FSB ports (FSB_Port_0 21 and FSB_Port_1 22), a coherency engine 23, a snoop filter 24, and protocol logic 25.

Snoop filter 24 may comprise one or more storage arrays such as, for example, a fully associative array, set associative array, or a directly mapped array that comprise ways or lines to store coherency information. In one embodiment, snoop filter 24 comprises a 96-way set associative array in which each of the 4K sets includes 96 slots (or ways) 225 (only one is shown) for storing coherency information of 96 cache lines. A cache line may be mapped to one of the 4K sets by, for example, using the last twelve bits of the memory address. Each way 225 may store information for a line. The information may include an address tag, coherency state bits 241, and a presence vector. The address tag may comprise all or a portion of the line's memory address. In the above example where the last twelve memory address bits are used to locate a set, the address tag may be the rest of the memory address bits preceding those twelve address bits. Coherency state bits 241 may indicate a collective coherency state (e.g. M, E, S, or I) of the cache line associated with the address tag. The presence vector may indicate which FSB 14 connects to the cache 12 that might have the cache line.

In one embodiment, snoop filter 24 may support coherency states of a shared (S) state and an exclusive/modified (E/M) state, each representing the collective state of a line in caches 12 of FIG. 1. Snoop filter 24 may contain the E/M state for a line if any cache 12 contains or may contain an exclusive copy of the line outside of main memory. Thus, the E/M state may be used by snoop filter 24 to indicate an exclusive coherency state of a line. A line having the E/M state is exclusively associated (e.g., owned or modified) with one of caches 12. With respect to the S state, snoop filter 24 may use the S state for a line if any cache 12 contains or may contain the line in the shared state. The presence vector for the line identifies the one or more FSBs 14 that connect to the one or more caches 12 that might have the line in the coherency state as indicated.

When a request for a memory transaction arrives at coherency controller 132, coherency engine 23 may determine where to forward the request. A memory transaction refers to a transaction that requires access to memory 15 or any caches 12. Coherency engine 23 may lookup snoop filter 24 to determine whether the snoop filter has information of the requested line. If snoop filter 24 has the information, coherency engine 23 forwards the request to the FSB port (21 or 22) connecting to the cache 12 that has a current copy of the line based on the coherency state and the presence vector of the line. If the transaction might potentially change the state of the requested line, coherency engine 23 updates the information in snoop filter 24 to reflect the changes. If snoop filter 24 does not have information for the line, coherency engine may add an entry to the snoop filter to record coherency information of the requested line.

Snoop filter 24 generally does not have enough space to accommodate every addressable lines of memory 15. Thus, snoop filter 24 may be full when a new request for a memory transaction arrives. When snoop filter 24 is full, one of the existing entries in snoop filter 24 may be evicted to make room for the new request. In one embodiment, the states of snoop filter 24 may not exactly correspond to the states of the caches 12 due to, for example, a processor 11 changing the state of a line in its local cache 12 without generating external signals to indicate the change. Thus, in one scenario, the entries having outdated states are good candidates for replacement. However, in the absence of observable signals from processor 11, the entries having the updated states cannot be easily identified. Thus, in one embodiment, an entry may be randomly selected for replacement in the requested set. A "requested set" herein refers to one of the sets in snoop filter 24 identified by the address of the requested line. The random selection may be based on a random number generated by random number generator 52.

Once an entry is evicted from snoop filter 24, a back-invalidation message is sent to each of caches 12 that potentially hold a valid copy of the line.

Prior to the random selection of a snoop filter 24 entry, entries that are predicted to be short-lived may be pre-selected. A short-lived snoop filter entry refers to an entry holding information for a line that will soon to be modified or disused. In one embodiment, an E/M line replacement technique may be implemented to pre-select one or more E/M entries for the random selection. An "E/M line" or an "E/M entry" herein refers to an entry in snoop filter 24 holding information for a line having the E/M state. A line having a shared (S) state is more likely to be longer-lived compared with a line having an E/M state. This is because when running software, code is often installed in the S state and often remains in use longer than data. Thus, pre-selecting E/M entries first protects code that may still be in use.

As a line in the E/M state is exclusively owned by one of caches 12, only one back-invalidation message is necessary to be sent on one of FSBs 14. In a system where more than two FSBs are used, the E/M line replacement technique causes only one back-invalidation message to be sent on one of the FSBs. In comparison, if a shared line is replaced and the shared line is held by caches 12 on both FSBs 14, two back invalidation messages would be required. More than two back invalidation messages would be required for a system having more than two FSBs. Since back-invalidation messages increase the address bus traffic and may potentially invalidate a valid data copy, reduction of the back-invalidations help improve the system performance.

Unconditionally replacing the E/M entries may sometimes increase the cache miss rate. If a processor 11 requests a line in its local cache 12 that has been back-invalidated, a cache miss occurs and the processor has to resort to a remote location (e.g., memory 15) to retrieve that line. To reduce the cache miss rate caused by the E/M line replacement technique, in one embodiment, an E/M entry may be replaced when the number of the E/M entries in the requested set reaches a threshold value. Protocol logic 25 may comprise an E/M threshold unit 54 to keep track of the number of E/M entries in each of the sets. If the number of E/M entries is less than a pre-configured threshold, a random entry in the requested set may be selected for replacement. The selection would be made among all of the entries in the set instead of just the E/M entries.

In one embodiment, protocol logic 25 may further comprise a conflict FIFO 56, which is a first-in-first-out buffer, for storing the set numbers of previous requests that caused a line replacement. The "set number" or "set identifiers" herein refers to the memory address bits of a line which uniquely identify a set in snoop filter 24. Upon the arrival of a new request for a memory transaction, the set number of the new request is compared with the previous set numbers in conflict FIFO 56. If the set number of the new request is already in conflict 56, a random entry among all of the entries, instead of just the E/M entries, in the requested set may be selected for replacement. Otherwise, a random entry among all of the E/M entries in the set is selected for replacement. Thereafter, the oldest entry in conflict FIFO 56 is removed and the new set number is entered into the FIFO.

Figure 3:
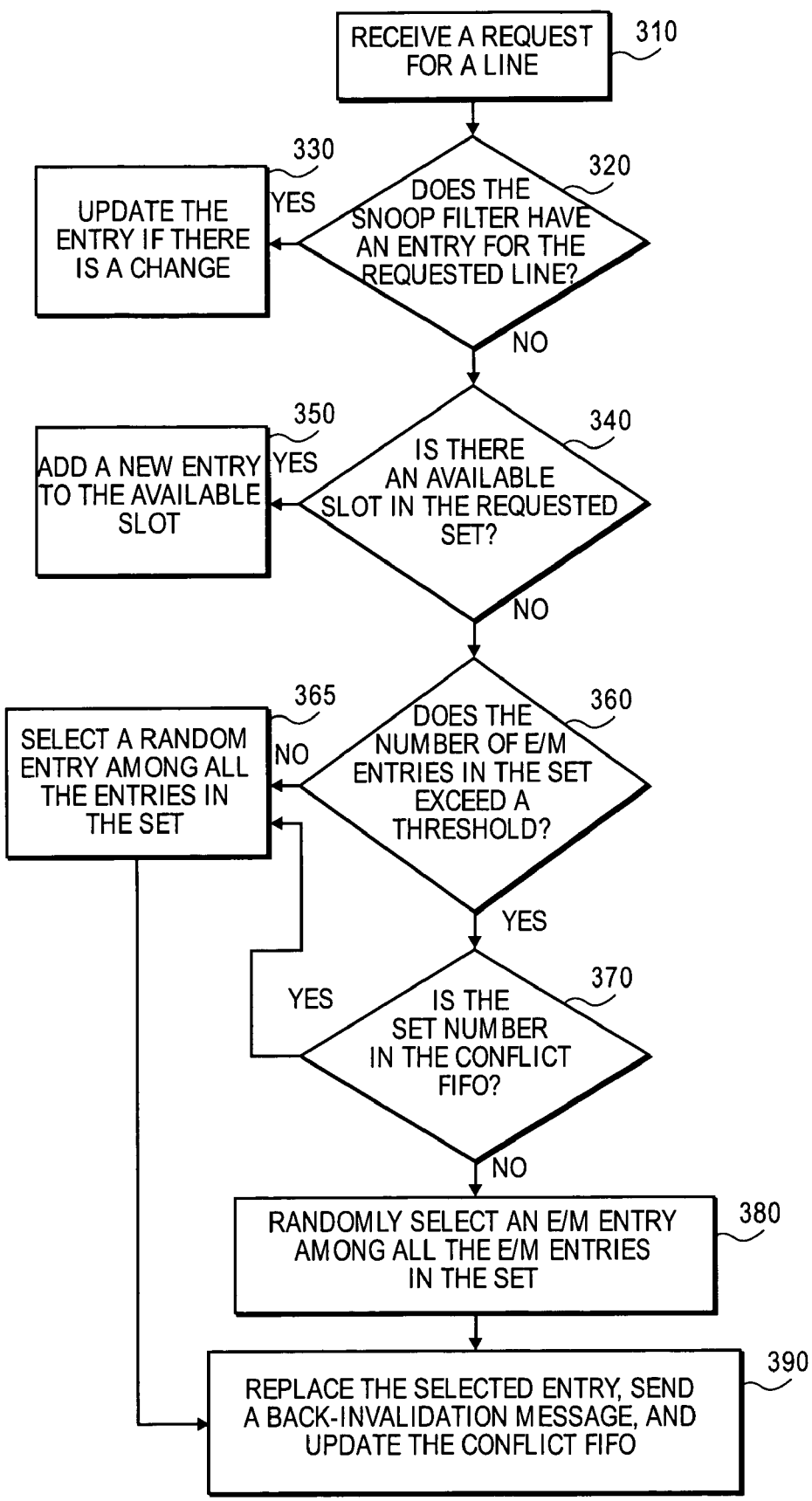
FIG. 3 is an example flow chart showing a process of selecting a data line for replacement in the snoop filter of FIG. 2.

An example process of the E/M line replacement technique is shown in FIG. 3. Referring also to FIG. 1 and FIG. 2, at block 310, coherency controller 132 receives a request from one of processing nodes 17 for a memory transaction. At block 320, coherency engine 23 looks up snoop filter 24 to determine if the requested line has an entry in the snoop filter. If there is an entry for the requested line in snoop filter 24 and if the request may cause a change in the coherency state of the line, at block 330, snoop filter 24 updates the entry to reflect the change. If the requested line does not have an entry in snoop filter 24, at block 340, coherency engine 23 determines if snoop filter 24 has an available slot in the requested set. An available slot may be a slot that is marked "invalid" in the coherency state bits or "not present" in the presence vector. If there is an available slot in the requested set, at block 350, a new entry for the requested line is added to that slot. If there is no available slot in the requested set, at block 360, threshold unit 54 determines if the number of E/M entries in the requested set exceeds a threshold. If the number of E/M entries in the set does not exceed the threshold, at block 365, a random entry among all the entries in the set is selected based on a random number generated by random number generator 52. If the number of E/M entries in the set exceeds the threshold, at block 370, protocol logic 25 determines if the set number of the requested line is in conflict FIFO 56. If the set number is in conflict FIFO 56, the process goes back to block 365 in which a random entry among all the entries in the set is selected for replacement. If the set number is not in conflict FIFO 56, at block 380, a random entry among all the E/M entries in the set is selected for replacement. It is to be understood that, in different embodiments, the order of blocks 360 and 370 may be exchanged. Once a replacement entry is selected, at block 390, the entry is replaced by a new entry representing the new requested line and a back-invalidation message is sent to the cache 12 holding a copy of the replaced line. Conflict FIFO 56 is updated to include the set number of the newly replaced line.

In the foregoing specification, specific embodiments have been described. It will, however, be evident that various modifications and changes can be made thereto without departing from the broader spirit and scope of the appended claims. The specification and drawings are, accordingly, to be regarded in an illustrative rather than a restrictive sense

What is claimed is:

1. A method comprising:
   receiving a request for a line;
   selecting an entry in a snoop filter for replacement by the requested line, wherein the entry is selected among entries predicted to be short-lived based on a coherency state; and
   sending an invalidation message to one of a plurality of caches with which the selected entry is associated.

2. The method of claim 1 wherein selecting further comprises:
   selecting among the entries having an exclusive coherency state which indicates exclusive association with one of the plurality of caches.

3. The method of claim 2 wherein selecting further comprises:
   selecting among the entries having the exclusive coherency state if the number of such entries in a requested set of the snoop filter exceeds a threshold, wherein the requested set is a portion of the snoop filter to which the requested line is mapped.

4. The method of claim 2 further comprising:
   retaining set identifiers of previously replaced entries in a First-In-First-Out (FIFO); and
   selecting among the entries having the exclusive coherency state in a requested set if the requested set is identified by a set identifier not already in the FIFO, wherein the requested set is a portion of the snoop filter to which the requested line is mapped.

5. The method of claim 1 wherein sending the invalidation message further comprises:
   sending the invalidation message via one of a plurality of datapaths connecting to the plurality of caches.

6. An apparatus comprising:
   a snoop filter including an array of entries to maintain coherency information for a plurality of caches;
   protocol logic coupled with the snoop filter to select an entry among the array of entries for replacement by a requested line, the selected entry being predicted to be short-lived based on a coherency state; and
   an engine, coupled to the snoop filter and the protocol logic, to send an invalidation message to one of the caches with which the selected entry is associated.

7. The apparatus of claim 6 wherein the protocol logic further comprises:
   a random number generator to randomly select the entry among the array of entries predicted to be short-lived.

8. The apparatus of claim 6 wherein the snoop filter further comprises:
   coherency state bits to indicate a coherency state of a snoop filter entry, wherein the selected entry has an exclusive coherency state which indicates an exclusive association with one of the caches.

9. The apparatus of claim 8 wherein the array of entries comprises:
   a set-associative array including a plurality of sets, wherein the entry selected for replacement is among the entries having the exclusive coherency state in a requested set to which the requested line is mapped, the requested set being one of the plurality of sets in the set-associative array.

10. The apparatus of claim 9 wherein the protocol logic further comprises:
    a threshold unit to compare a threshold value with the number of the entries having the exclusive coherency state in the requested set.

11. The apparatus of claim 9 wherein the protocol logic further comprises:
    a first-in-first-out (FIFO) to retain set identifiers of previously replaced entries, wherein the protocol logic selects among the entries having the exclusive coherency state in the requested set if the requested set has a set identifier not already in the FIFO.

12. The apparatus of claim 6 further comprising:
    a plurality of datapaths, through one of which the invalidation message is sent to the one of the caches with which the selected entry is associated.

13. The apparatus of claim 6 further comprising:
    a plurality of datapaths, through less than all of which the invalidation message is sent.

14. A system comprising:
    a plurality of processors;
    a server memory, wherein a portion of the server memory is cached by a plurality of caches coupled to the plurality of processors;
    a server input/output device to receive and respond to external requests; and
    a chipset including
       a snoop filter including an array of entries to maintain coherency information for the caches;
       protocol logic coupled to the snoop filter to select an entry among the array of entries for replacement by a requested line, the selected entry being predicted to be short-lived based on a coherency state; and an engine, coupled to the snoop filter and the protocol logic, to send an invalidation message to one of the caches with which the selected entry is exclusively associated.

15. The system of claim 14 wherein the snoop filter further comprises:
coherency state bits to indicate a coherency state of a snoop filter entry, wherein the selected entry has an exclusive coherency state which indicates an exclusive association with one of the caches.

16. The system of claim 15 wherein the array of entries comprises:
a set-associative array including a plurality of sets, wherein the entry selected for replacement is among the entries having the exclusive coherency state in a requested set to which the requested line is mapped, the requested set being one of the plurality of sets in the set-associative array.

17. The system of claim 16 wherein the protocol logic further comprises:
a threshold unit to compare a threshold value with the number of the entries having the exclusive coherency state in the requested set.

18. The system of claim 16 wherein the protocol logic further comprises:
a first-in-first-out (FIFIO) to retain set identifiers of previously replaced lines, wherein the protocol logic selects among the entries having the exclusive coherency state in the requested set if the requested set has a set identifier not already in the FIFO.

19. The system of claim 14 further comprising:
a plurality of datapaths, through one of which the invalidation message is sent to the one of the caches with which the selected entry is associated.

20. The system of claim 14 further comprising:
a plurality of datapaths, through less than all of which the invalidation message is sent.

* * * * *